March 27, 1951 C. H. HARMON 2,546,394
FOOTREST
Filed Aug. 20, 1947 2 Sheets-Sheet 1
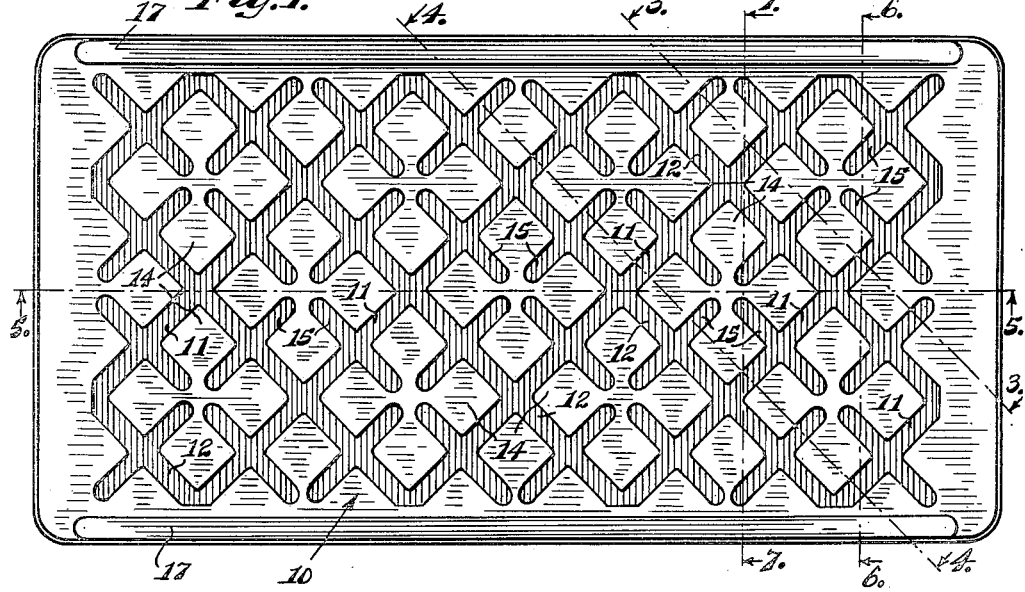
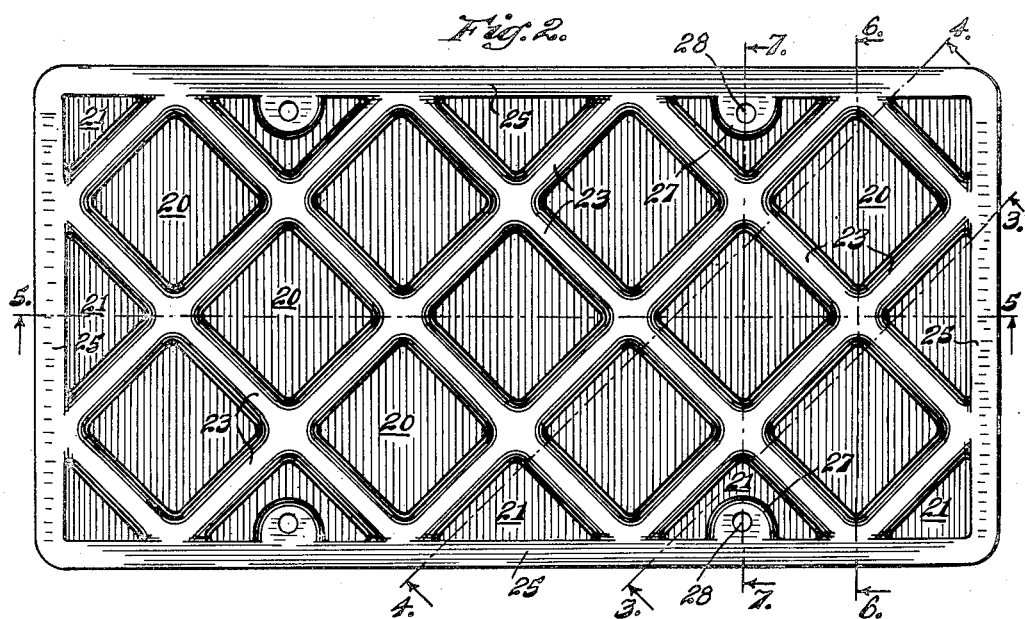
INVENTOR.
Cline Harry Harmon,
BY
Baur & Freeman
Att'ys.

March 27, 1951  C. H. HARMON  2,546,394
FOOTREST
Filed Aug. 20, 1947  2 Sheets-Sheet 2
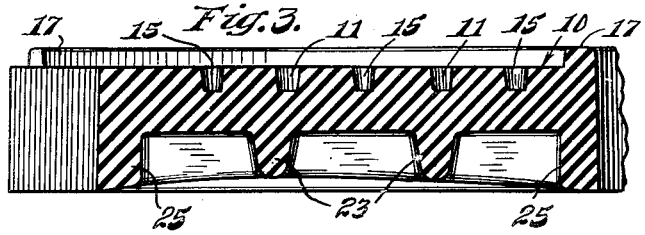
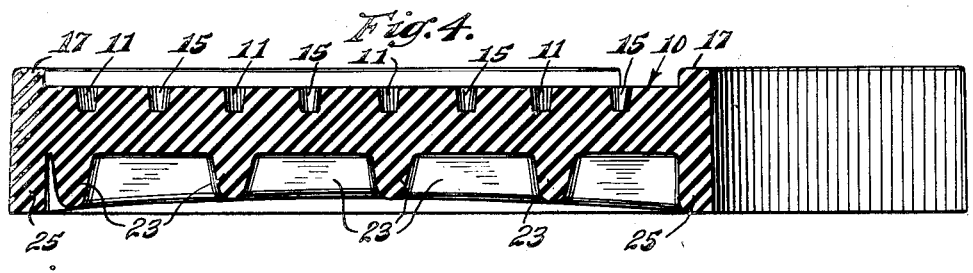
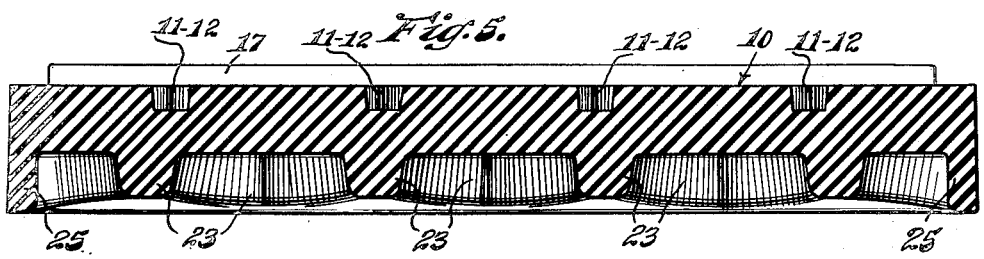
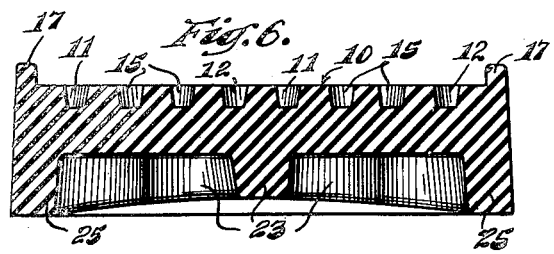
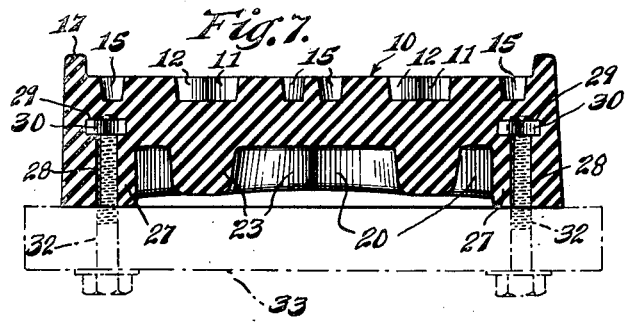
INVENTOR.
Cline Harry Harmon.
BY
Bair & Freeman
Attys.

Patented Mar. 27, 1951

2,546,394

UNITED STATES PATENT OFFICE 2,546,394

FOOTREST

Cline Harry Harmon, Waterloo, Iowa, assignor to Waterloo Foundry Company, Waterloo, Iowa, a co-partnership Application August 20, 1947, Serial No. 769,647

12 Claims. (Cl. 154—49)

The present invention relates to a footrest of the type adapted for use in a manner so as to effect a cushioning or shock absorbing action.

It is well known that persons who are compelled to assume a standing position in connection with the operation of various equipment such as tractors, earth working machinery, cranes, and the like, are subject to considerable strain, shock and fatigue, caused by intense vibrations or abrupt impact in the use of the equipment. For example, in operating tractors over rough terrain, such as in connection with tilting or working of the soil, it is frequently necessary for the operator of the tractor to stand in upright position, and hence the vibrations and shocks transmitted by the vehicle through the operator's feet are very substantial and readily cause fatigue, together with attendant shock to the nervous system of the operator.

One of the objects of the present invention is to provide a novel footrest of the character indicated for use in connection with equipment subject to strong or intense vibrations and shocks so as to cushion and absorb vibrations and sudden jolts, and greatly reduce the transmission of same to the operator when standing thereon in a normal position for operating the equipment.

Another object is to provide an improved shock absorbing footrest of the character indicated, provided with a safety tread surface for reducing possibility of slippage of the operator's foot when in engagement therewith.

A further object is to provide an improved shock absorbing footrest of the character indicated, having a relatively flat foot engaging safety tread surface and raised abutments at the sides thereof to positively limit slippage of the foot off of the tread.

A still further object is to provide a novel and improved footrest of the character indicated, formed of resilient material, and having a hollow underside so as to permit support thereof, principally on the marginal edges thereof, so as to permit downward yielding of the intermediate portion when pressure is applied on the tread.

And still another object is to provide a novel footrest of the character indicated which is durable and efficient in use, and which is capable of being economically manufactured.

Other objects and advantages of the present invention will be apparent from the following description, taken in connection with the accompanying drawings in which:

Figure 1 is a top plan view on reduced scale, of a footrest embodying the present invention;

Figure 2 is a bottom view of the footrest;

Figures 3, 4, 5, 6 and 7 are diagonal, longitudinal and transverse sectional views through the footrest, taken substantially as indicated at lines 3—3, 4—4, 5—5, 6—6, and 7—7 on Figure 1, and for convenience these same section lines are represented on Figure 2, to insure proper understanding of the formation of the underside of said footrest.

The present application is a continuation in part of my co-pending application, Serial No. 729,840, filed February 20, 1947, now abandoned.

The footrest embodying the present invention is preferably formed as a unitary mat type article of material having substantial resilient characteristics, such as rubber. For economy in manufacture, the footrest is preferably molded as a unitary article.

As seen in the drawings, the footrest is of elongated rectangular form, and preferably of such dimensions as to afford adequate supporting surface for a shoe or boot of usual range of sizes. If desired, the footrest may be made in a size sufficient so that it serves as a proper support for both shoes or boots of an operator in a standing position.

As may be seen in the drawings, the footrest is formed of substantial thickness and the top tread surface, indicated generally at 10, is formed with a series of parallel grooves 11, extending at an obtuse angle and terminating adjacent the marginal edges of the footrest. A second series of similar grooves, indicated at 12 is disposed in oppositely inclined relation, and as shown, are arranged at approximately right angles to the grooves 11, thus forming a plurality of substantially square tread surface areas, indicated at 14. Each of the tread surfaces 14 is formed with a plurality of short grooves 15, located substantially centrally of, and perpendicularly with respect to each marginal side edge thereof, and opening at one end into said grooves 11 and 12 as clearly seen in the drawing. By virtue of the grooves 11, 12, and 15, formed in the upper surface of the mat, said tread surface serves effectively as an anti-skid or anti-slip surface.

Formed adjacent each of the long sides of the footrest, beyond said grooves 11 and 12, are upstanding abutments 17, herein shown as continuous ribs, which serve as positive stops to prevent slippage of the foot off of the tread area. If desired said abutments may be formed as a series of separate projections.

The underside of the rectangular mat is cored out so as to provide a multiplicity of cavities 20, preferably of substantially square outline, and disposed in substantially vertical alignment with the square tread portions 14 formed in the upper surface of the mat, as may be seen in the drawings. At the marginal edges of the underside of the mat, there are cavities of generally triangular shape, as indicated at 21, and which are complementary to the remaining portions of the tread on the upper surface of the mat, located at the outer marginal edges, beyond the generally square tread portions 14. By virtue of the cored out portions constituting the cavities 20 and 21, the underside of the mat is of waffle-like form. The cavities are separated by ribs 23, and the outer walls of the triangular cavities 21 are formed by the outer wall 25 of the footrest.

The ribs 23, which extend diagonally, in the form of two right angularly arranged series, gradually increase in depth from adjacent the central area, toward the outer marginal edges of the footrest. The footrest normally is supported by the outer surrounding wall 25, and due to the form and arrangement of the ribs 23 the intermediate area of the footrest is unsupported and hence will readily yield when foot pressure is applied on the tread.

Molded integrally with the mat on the underside, preferably at either or both sides thereof, are a plurality of bosses indicated at 27, formed with a duct 28, the upper end of which opens into a cavity 29, of sufficient size for accommodating a nut 30. Each mat is adapted to be securely anchored in position, such as on the floor of a tractor, by bolts, indicated in dot and dash outline at 32, extending up through the floorboard, as indicated at 33, into the mat, in threaded engagement with the nut 30.

It will now be apparent that the thickness of the body of the mat, for the respective tread areas 14, is considerably less than the total overall thickness thereof, and as seen in the drawings, is approximately one-half. The thickness of the body of the mat in these areas, and more specifically, in the areas beneath the grooves 15, is further reduced, and by reason of the cavities 20 and 21, the tread surface of the mat thus, in effect, becomes divided up into a multiplicity of separate areas and due to the height of the ribs 23 a tread area is provided which possesses substantial resiliency and cushioning effect, so as to readily cushion and absorb transmission of vibrations and sudden shocks from the vehicle or equipment to the operator when standing upon the footrest or mat.

Although I have herein shown and described a preferred embodiment of my invention, manifestly it is capable of modification and rearrangement of parts without departing from the spirit and scope thereof. I do not, therefore, wish to be understood as limiting this invention to the precise form herein disclosed, except as I may be so limited by the appended claims.

I claim as my invention:

1. A footrest of the character described, comprising a mat molded as a unitary article of resilient material and of substantial thickness, the upper surface of the mat being provided with a multiplicity of grooves, arranged in two series and extending in opposite directions and thereby forming a plurality of separate tread areas, the underside of the mat being formed with a cavity in substantial vertical alignment with each of the respective tread areas.

2. A footrest of the character described, comprising a mat molded as a unitary article of resilient material and of substantial thickness, the upper surface of the mat being provided with a multiplicity of grooves, arranged in two series and extending in opposite directions and thereby forming a plurality of separate tread areas, the underside of the mat being formed with a cavity in substantial vertical alignment with and of approximately the same size and shape of each of the respective tread areas.

3. A footrest of the character described, comprising a mat molded as a unitary article of resilient material and of substantial thickness, the upper surface of the mat being provided with a multiplicity of grooves, arranged in two series and extending in opposite directions and thereby forming a plurality of substantially rectangular, separate tread areas, the underside of the mat being formed with a cavity in substantial vertical alignment with and of approximately the same size and shape of each of the respective tread areas.

4. A footrest of the character described, comprising a mat molded as an elongated unit of resilient material and of substantial thickness, the upper surface of the mat being suitably grooved to provide a tread tending to oppose slippage thereover, the underside of mat being formed with a multiplicity of cavities shaped and arranged so as to provide a multiplicity of separate, resilient tread areas, and abutment means on the upper surface, each abutment means being in the form of an elongated narrow upstanding rib adjacent to and extending substantially the length of each of the long sides of the mat, adapted to serve as positive stops to limit lateral slippage of the foot when positioned on the tread.

5. A footrest of the character described, comprising a molded mat of resilient material having its upper surface suitably formed to provide a tread tending to preclude slippage, the underside of the mat having two series of oppositely arranged ribs defining a multiplicity of spaced apart cavities of a depth approximately one-half the thickness of the mat, to provide a multiplicity of separate, relatively resilient tread areas, the ribs of one of the series increasing in height progressively from an intermediate area of the mat toward the outer marginal edges thereof.

6. A footrest of the character described, comprising a molded mat of resilient material having its upper surface suitably formed to provide a tread tending to preclude slippage, the underside of the mat having two series of oppositely arranged ribs defining a multiplicity of spaced apart cavities of a depth approximately one-half the thickness of the mat, to provide a multiplicity of separate, relatively resilient tread areas, the ribs increasing in height progressively from an intermediate area of the mat toward the outer marginal edges thereof.

7. A footrest of the character described, comprising a molded mat of resilient material having its upper surface suitably formed to provide a tread tending to preclude slippage of a foot thereon, the underside of the mat having two oppositely disposed series of ribs defining thereby a plurality of spaced apart cavities of substantial depth, said ribs increasing in height progressively from approximately the middle of the mat to the outer marginal edges thereof.

8. A footrest of the character described, comprising a mat molded as a unitary article of resilient material and of substantial thickness, the upper surface of the mat being provided with a multiplicity of main grooves, arranged in two series and extending in opposite directions and thereby forming a plurality of separate tread areas, and a plurality of short grooves extending from said main grooves into said tread areas from the sides thereof, the ends of said short grooves being disconnected and spaced from one another within said tread areas, the underside of the mat being formed with a plurality of cavities of substantial depth relative to the thickness of the mat.

9. A footrest of the character described, comprising a mat molded as a unitary article of resilient material and of substantial thickness, the upper surface of the mat being provided with a multiplicity of main grooves, arranged in two series and extending in opposite directions and thereby forming a plurality of substantially rectangular, separate tread areas, and a plurality of short grooves extending from said main grooves into said tread areas from the sides thereof, the ends of said short grooves being disconnected and spaced from one another within said tread areas, the underside of the mat being formed with a cavity in registration with and of approximately the same size and shape of each of the respective tread areas, said cavities being of substantial depth relative to the thickness of the mat.

10. A footrest of the character described, comprising a mat molded as a unitary article of resilient material and of substantial thickness, the upper surface of the mat being provided with a multiplicity of grooves, arranged in two series and extending in opposite directions and thereby forming a plurality of substantially rectangular, separate tread areas, the underside of the mat having two series of oppositely arranged ribs in register with respective ones of said grooves, said ribs defining a multiplicity of spaced apart cavities of a depth approximately one-half the thickness of the mat, said cavities thereby being in register with respective ones of said tread areas on the upper surface of the mat, the mass of material in said ribs compensating for the loss of material caused by said grooves thereby providing strength, with resiliency, to the mat.

11. A footrest of the character described, comprising a mat molded as a unitary article of resilient material and of substantial thickness, the upper surface of the mat being provided with a multiplicity of grooves, arranged in two series and extending in opposite directions and thereby forming a plurality of substantially rectangular, separate tread areas, the underside of the mat having two series of oppositely arranged ribs in register with respective ones of said grooves, said ribs defining a multiplicity of spaced apart cavities of a depth approximating one-half the thickness of the mat, said cavities thereby being in register with respective ones of said tread areas on the upper surface of the mat, the mass of material in said ribs compensating for the loss of material caused by said grooves thereby providing strength, with resiliency to the mat, said ribs increasing in height progressively from an intermediate area of the mat toward the outer marginal edges thereof.

12. A footrest of the character described, comprising a mat molded as a unitary article of resilient material and of substantial thickness, the upper surface of the mat being provided with a multiplicity of grooves, arranged in two series and extending in opposite directions, the spacing of adjacent grooves being substantial relative to the thickness of the mat, said grooves forming a plurality of substantially rectangular, separate tread areas, the underside of the mat having two series of oppositely arranged ribs in register with respective ones of said grooves, said ribs defining a multiplicity of spaced apart cavities of a depth approximating one-half the thickness of the mat, said cavities thereby being in register with respective ones of said tread areas on the upper surface of the mat, said cavities cooperating with said tread areas and being effective for providing resiliency to said tread areas, the mass of material in said ribs compensating for the loss of material caused by said grooves thereby providing strength, with resiliency to the mat.

CLINE HARRY HARMON.

REFERENCES CITED

The following references are of record in the file of this patent:

UNITED STATES PATENTS

| Number | Name | Date |
| --- | --- | --- |
| 1,250,959 | Brown | Dec. 25, 1917 |
| 1,602,240 | Miller | Oct. 5, 1926 |
| 1,641,029 | Gaudet | Aug. 30, 1927 |
| 1,948,327 | Berwick | Feb. 20, 1934 |
| 2,076,122 | Duryee | Apr. 6, 1937 |
| 2,275,575 | Vrooman | Mar. 10, 1942 |

FOREIGN PATENTS

| Number | Country | Date |
| --- | --- | --- |
| 28,502 | Great Britain | 1907 |
| 330,456 | Great Britain | June 12, 1930 |